Dec. 26, 1933.   M. RICHTER   1,941,419
FRICTIONAL CONNECTING MEANS FOR STRAIGHT KNITTING MACHINES
Filed April 11, 1933
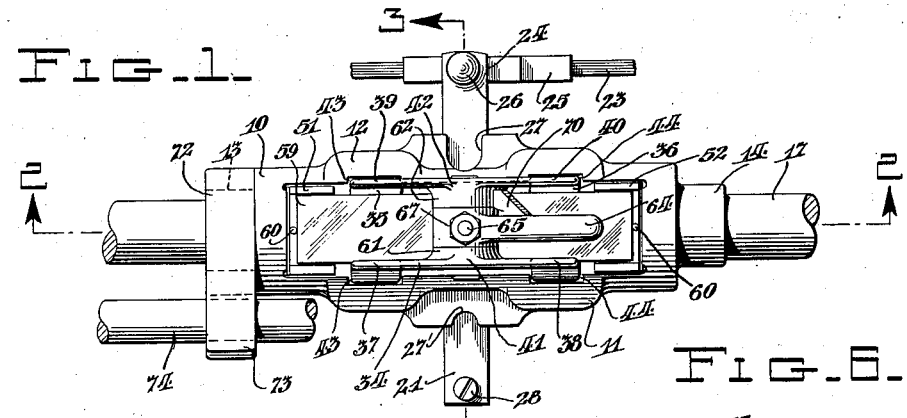
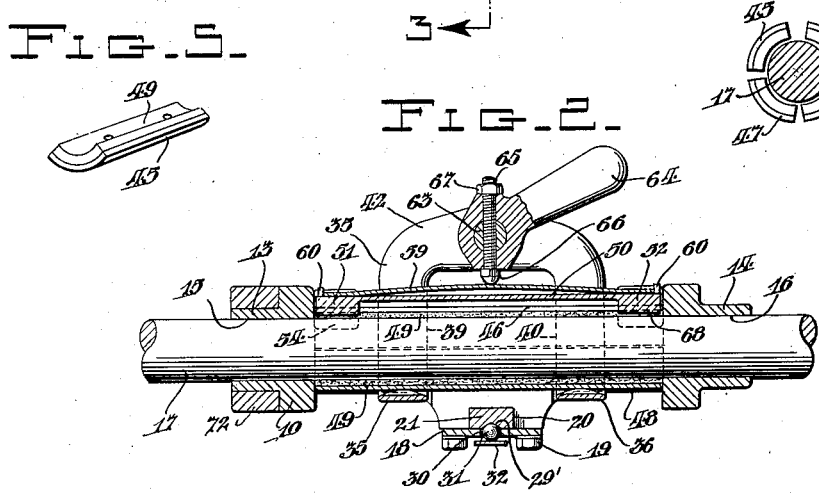
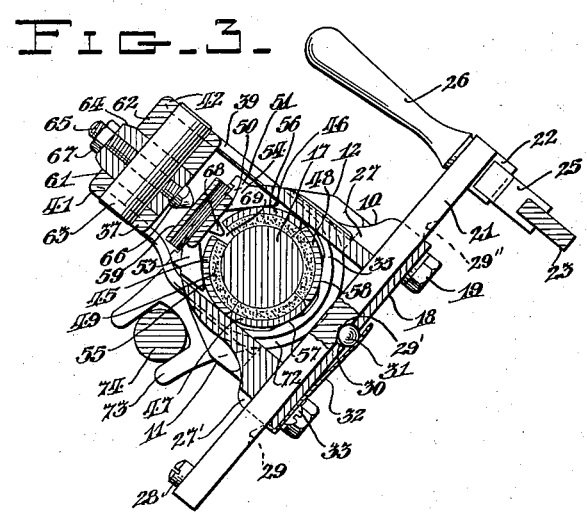
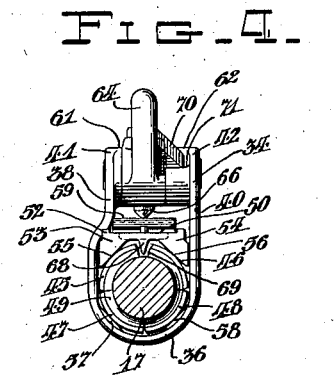
INVENTOR:
Max Richter,
BY Alfred E. Ischinger,
ATTORNEY.

Patented Dec. 26, 1933

1,941,419

UNITED STATES PATENT OFFICE 1,941,419

FRICTIONAL CONNECTING MEANS FOR STRAIGHT KNITTING MACHINES

Max Richter, West Reading, Pa., assignor to Textile Machine Works, Wyomissing, Pa., a corporation of Pennsylvania Application April 11, 1933. Serial No. 665,505

17 Claims. (Cl. 66—126)

This invention relates generally to frictional connecting means of the type arranged to operatively connect a reciprocable rod and a motion transmitting device in slidable frictional engagement therewith, and more particularly to an improved form of friction box structure for transmitting the coulier motion to the various reciprocable thread carrier bars in flat knitting machines.

The thread carrier bars of flat knitting machines are arranged to slide longitudinally of the machine and to engage relatively fixed stops so as to limit the movement of the thread guides relative to the needles of the knitting machine, thereby to determine the shape or width of the fabric as well as the extent of the reinforcing or plating effect produced. The carrier bars are actuated through motion transmitting devices in the form of frictional connecting boxes slidably mounted on a friction rod that receives a constant and uniform longitudinal reciprocating movement from the coulier mechanism; such movement being substantially greater than the maximum travel of each and all the carrier bars. The friction boxes are arranged to be clamped to the friction rod, for unitary movement therewith, and for sliding motion relative thereto, subsequent to the abutment of carrier bars with their limiting stops.

Friction boxes of the above character are desirably arranged to maintain a smooth and uniform gripping and sliding coaction with the friction rod of the coulier mechanism, and also to provide a substantially rigid connection between the friction boxes and the friction rod under the above noted circumstances. The gripping action exerted by the friction boxes upon the friction rod must be such that a very secure frictional grip is applied and maintained during operation of the carrier bars; and under the latter conditions the friction box must permit the friction rod to slide freely through the box.

Variations in the lubricating conditions, and other causes as well, have heretofore resulted in chattering and undue vibration between the friction boxes and the friction rod under the relative sliding movement therebetween. For instance, considerable heat is generated when the friction boxes are forced to axially slide on the friction rod, and the heat developed in the friction rod and friction boxes affects or prevents smooth and uniform gripping and sliding coaction between the friction rod and the boxes, and impairs in various ways the efficiency and operation of these elements.

One detrimental effect due to the heating of the friction rod is as follows: In order to obtain the desired adhesion between the rod and those parts of the friction boxes, especially the leather friction shoes, which engage the rod, a suitable grease, oil or other substance, which also acts as a lubricant, is applied to the rod and friction shoes. Heating of the rod causes the grease or oil to run off or disappear, so that the rod and friction shoes become dry, thus losing the desired adhesive effect, and also causing overheating of the friction parts due to lack of a lubricant. The heat generated may also cause scoring of the actuating rod surfaces, and the necessity of frequent replacements of friction shoes, with the attendant disadvantages of interference with the continuous operation of the machine.

Another defect of prior friction box constructions is that where but two directly opposite friction shoes have been employed the combined excessive pressure and heat has resulted in a noticeable flattening of two sides of the rod, causing the friction boxes to function imperfectly.

The present invention aims to enable the friction box to uniformly and substantially rigidly grasp the friction rod, or other equivalent reciprocable rod, and maintain such substantially rigid connection when the parts are moving in unison, and to permit the friction rod to slide freely through the box without binding or chattering after the carrier bars have engaged their limiting stop abutments.

Another object of the invention is to enable the friction box to apply its gripping pressure upon the friction rod at a plurality of points along lines at an angle to each other circumferentially of the friction rod as well as for a substantial distance longitudinally thereof, so that the clamping pressure will be distributed uniformly and practically continuously upon the outer periphery of the rod; also, so that the construction will effectively limit or control the temperature rise of the frictionally engaging parts and also dissipate a substantial part of the heat generated.

Still another object is to enable the friction box to exert a very firm grip upon a relatively slidable rod with minimum clearance between the rod and box and with a minimum degree of direct pressure, the grip being quickly applied and quickly releasable.

Yet another object is to produce a friction box which will be simple and rugged in construction and positive in its action under all operating conditions as well as under varying conditions of lubrication, which will be easy to disassemble, and which will be self-adjusting to take up wear on the friction parts.

With these and other objects in view, which will become apparent from the following detailed description of the illustrative embodiment of the invention shown in the accompanying drawing, my invention resides in the novel elements of construction, mechanisms and combination of parts in cooperative relationship, as hereinafter more particularly pointed out in the claims.

In the drawing:

Fig. 1 is a top plan view showing the friction box operatively associated with the friction rod of the coulier mechanism and a thread carrier bar;

Fig. 2 is a longitudinal sectional view through the friction box taken substantially on the line 2—2 of Fig. 1, looking in the direction of the arrows;

Fig. 3 is a transverse sectional view through the friction box, taken substantially on the line 3—3 of Fig. 1, but shown in the working position it occupies on the machine;

Fig. 4 is a detail end view partly in section showing the clamping frame or ligature with the housing removed;

Fig. 5 is a perspective view of one of the frictional bearing shoes or segments; and Fig. 6 is an exploded diagrammatic view illustrating the quadrant arrangement of the respective frictional bearing shoes or segments in their gripping relation to the friction rod.

Only those parts of a straight knitting machine necessary for an understanding of the invention are shown in the drawing; the various other parts and mechanisms and their manner of operations are well known in the art, and are shown and described in detail in the "Reading" Full Fashioned Knitting Machine Catalogue (copyright 1929) published by the Textile Machine Works, Reading, Pennsylvania.

The motion transmitting device is here shown as a friction box for use in flat knitting machines, and in this instance includes an elongated outer shell or housing 10, having side walls 11 and 12 and opposite cylindrical end portions 13 and 14. These end portions 13 and 14 have axially aligned bores 15 and 16, respectively adapted to receive the friction rod 17 in sliding relation longitudinally of the housing 10. The friction rod may be a splicing rod or the so-called coulier rod associated with the coulier mechanism of a flat knitting machine, which mechanism (not shown herein) is usually arranged to convert rotary motion from a suitable source into reciprocatory motion and to transmit the latter in turn to the friction rod.

The side walls 11 and 12 are extended downwardly and are connected at their respective lower ends by a transverse guide plate 18 bolted thereto as indicated at 19. Aligned rectangular openings are provided in the lower ends of the walls 11 and 12 as indicated at 20; and slidably fitted within these openings 20, and transversely of the housing 10, is an elongated slide member 21. This slide member is arranged to traverse the upper surface of the guide plate so that the locking block 22 provided at one of its ends may be properly aligned with a selected thread carrier bar 23 and connected thereto by lodgment of the block 22 in a groove 24 formed in a fitting 25 secured to the thread carrier bar 23. The slide 21 is provided with a handle 26 adapted to be retracted into a recess 27 formed in the lower end of housing wall 12, for manually releasing the carrier bar from the friction box. The opposite end of the slide is provided with a suitable stop screw 28 to prevent unintentional displacement of the slide from the housing, and the lower end of the housing wall also has a recess 27' to accommodate the stop screw 28 when the slide is moved to its extreme outward position.

Means are provided to hold the slide 21 in the desired position of adjustment for alignment of the locking block 22 thereof with the selected carrier bar. In this instance such means consist of a ball detent device formed by providing the under side of the slide with a plurality of suitable spaced recesses 29, 29' and 29'', and the guide plate 18 with a through hole 30 arranged to admit a steel ball 31, which latter is of greater diameter than the thickness of the guide plate, into one of the recesses; the ball 31 being urged toward seating position in the selected recess by means of a flat spring 32 secured to the under side of the guide plate, as seen at 33 in Fig. 3.

Clamping means are provided, as part of the friction box, whereby to operatively connect the friction box to, and disconnect it from, the friction rod, and when connected to maintain a substantially uniform gripping and sliding coaction between the box and the rod. In this instance such clamping means includes a unitary clamping frame 34 composed of a pair of complementary transversely arranged yoke members 35 and 36, U-shaped, and aligned one with another, and having their respective upwardly extending arms 37 and 38 at one side, and 39 and 40 at the opposite side, joined respectively by longitudinally extending integral inverted U-shaped portions 41 and 42.

The arms 37, 38 and 39, 40 are arranged to seat in pairs of transversely aligned similar recesses 43, 43 and 44, 44 respectively, formed in the inner wall of the housing 10, the lower ends of the yoke members 35 and 36 substantially embracing the guide plate 18, as clearly seen in Fig. 2. The clamping frame thus extends through the hollow interior of the housing to a position in which the yoke members 35 and 36 surround the outer circumferential limits of the bores 15 and 16, and the clamping frame 34 is thus more or less loosely held in interlocking relation with the housing 10.

The present preferred means, forming part of the friction box, for connecting the latter and the friction rod, are arranged to apply frictional and clamping pressure substantially uniformly and continuously upon the friction rod at a plurality of diametrically opposite points about the outer circumference of the friction rod 17. For this purpose a plurality of elongated segmental friction shoes 45, 46, 47 and 48 are disposed about the outer surface of the friction rod, and longitudinally thereof, each of these shoes representing substantially a quadrant of the circumferential area of the friction rod between the limits defined by the inner ends of the opposite end portions 13 and 14 of the housing 10.

Each segmental friction shoe is arcuate in form, the concave inner surface thereof being provided with a lining of suitable frictional bearing material, in this instance a layer of leather 49, riveted or otherwise suitably secured thereto. The linings 49 of the several friction shoes are arranged for frictional sliding contacting relation with the outer surface of the friction rod 17.

The friction shoe segments in this instance are disposed edge to edge about the friction rod at an angle of substantially 90° one to another, in such manner that one is above another at each side of the friction rod, one pair of shoes 47, 48 occupying the space between the under side of the friction rod and the bottom of the clamping frame, and the other pair 45, 46 being disposed at the upper sides of the rod.

Pressure applying means are provided to urge the friction shoes firmly and uniformly about the friction rod. In this instance there is provided, above the upper pair of friction shoes 45, 46 an elongated bar or bridge member 50 having at opposite ends downwardly extending saddle members 51 and 52, respectively. The saddle members are of like construction, so that a description of one will suffice for both. Each saddle member includes a pair of pressure applying block portions 53 and 54 one disposed at each side; and these blocks 53 and 54 are formed with downwardly and outwardly inclined flat inner portions 55 and 56 adapted to engage the outer sides of the upper pair of arcuate friction shoes 45 and 46, respectively, at substantially or approximately the median portions of the latter, and radially of the rod 17. The U-shaped yoke members 35 and 36 are also provided with integrally formed upward and outwardly inclined pressure applying block portions 57 and 58, respectively, adapted to engage the outer sides of the lower friction shoes 47 and 48, respectively, at substantially the same angle and in a manner substantially similar to the blocks 53 and 54. The angular engagement of the four pressure applying portions with the quadrant sections provides an arrangement which simulates the desirable effect of a double V-block gripping action upon the friction rod, with lines of pressure acting constantly upward, downward and from each side of the friction rod. Thus, less actual pressure upon the rod is required in order to obtain a firm grip thereon. Another advantage of the invention is that the frictional heat is distributed at a plurality of points over peripheral surface of the friction rod.

The pressure applying means also desirably include a flat elongated upwardly bowed spring 59, the opposite ends of which rest upon the saddle members, the spring being detained against dislodgement by suitable stop pins 60, one of which extends upwardly from each of the saddle members 51 and 52, in abutting relation with the end of the spring.

A pair of inwardly extending hub or bearing members 61 and 62 are provided on the inverted U-shaped portions 41 and 42 of the clamping frame, above, and preferably approximately centrally of, the spring 59. A pin 63 is rotatably mounted in these bearing hubs; and a hand lever 64 is fixedly secured to the pin 63. In the present instance this hand lever is secured to the pin 63 by means of a bolt 65 which is threaded through the pin and lower part of the hand lever, and at an angle to the latter, the head 66 of the bolt being located at the under side of the hand lever, in position to engage the upper surface of the spring 59. The opposite end of the bolt also extends beyond the upper side of the lower hand-lever-portion, to receive a suitable securing nut 67, the arrangement being such that the bolt may be screwed out to cause the head 66 to project any desired distance, for imposing the requisite pressure upon the spring 59, and secured in the adjusted position by means of the nut 67.

Downward movement of the hand lever 64, with consequent swinging of the head 66 toward the spring 59, causes the bolt head to bear upon the spring 59, thus drawing the U-shaped clamping frame members 35 and 36 upwardly to press the lower friction shoes 47 and 48 against the friction rod, while at the same time causing the saddle members 51 and 52 to exert downward pressure upon the upper friction shoes 45 and 46, so that the four friction shoes firmly and yet resiliently grip the friction rod 17. With the present construction only relatively slight spring pressure is required.

To further insure uniformity of the gripping pressure upon the friction rod, as well as to anchor the friction shoes against rotative movement and ensure proper alignment of the shoes at all times, each of the saddle members is provided with a downwardly extending central stop member or separator 68. These stop members are arranged to enter the interstice, as seen at 69, between the upper pair of friction shoes, and thus prevent rotative movement of the shoe segments relatively to other parts of the friction box.

To limit the downward movement of the hand lever, a suitable stop 70 is provided on the hand lever to engage an abutment 71 provided on the hub 62, in such relation that the hand lever will be held in locked position when the bolt head 66 has been moved to its effective position.

To prevent relative rotation between the friction box and the friction rod, the friction box is provided at one of its ends, as for instance the end 13, with a guide arm 72 having arms 73 extending around and at opposite sides of a guide rod 74 which is rigidly secured in a position laterally spaced from and parallel to the friction rod 17.

When secured in gripping position upon the friction rod, the friction box, as it moves with the rod 17, will communicate reciprocating movement to the carrier bar 23, until the carrier bar engages the usual fixed stop (not shown) arranged to limit the travel of the thread carriers. Continued movement of the friction rod will cause the rod to slide through the friction box until the reverse movement of the friction rod occurs, whereupon the friction box, and hence the carrier bar will be carried in the opposite direction in a like manner.

Any conventional or suitable means for lubricating the friction rod may be employed with the present friction box, since the construction is particularly adapted to function properly under all normal conditions, whether the rod has been newly and hence possibly heavily lubricated, or the lubricant has been wholly or partly consumed due to a period of use.

When the friction box is to be rendered inoperative so that the rod 17 will reciprocate without carrying the friction box along with it, the hand lever 64 is raised, thus releasing the pressure practically simultaneously from all four of the friction shoes, and affording adequate clearance to the friction rod to slide freely through the open friction box without any movement of the latter, the drag of the carrier bar being more than sufficient to hold the friction box stationary.

Removal of the friction box from the friction rod permits the box to be easily disassembled for cleaning, repair, or otherwise, it being simply necessary to draw the clamping frame from the housing, whereupon the spring, saddle bar and shoe segments may be easily removed. Also, removal of the end stop screw of the slide permits the latter's ready removal.

It is to be understood that instead of four segmental shoes as herein provided, any desired number may be employed in excess thereof, or even, say three shoes; it being an object of the present invention that the lines of pressure on the friction rod be radially effective at diametrically opposite points in a plurality of locations and along different radial lines at an angle to each other in the case of adjacent shoes; in contradistinction to friction box constructions in which the lines of pressure are directed from, say, two directly opposite points or directions.

Of course, the improvements specifically shown and described, by which I obtain the above results, can be changed and modified in various ways without departing from the scope of the invention herein disclosed and hereinafter claimed.

I claim:

1. In combination with a reciprocating rod, a motion transmitting device arranged to clampingly and slidingly engage said rod, said device including a plurality of fricton shoe segments arranged substantially edge to edge about said rod, and pressure applying means for individually pressing adjacent segments inwardly at an angle to each other to uniformly clamp the same about the rod.

2. A frictional device for use with a reciprocating rod, including a housing having bearing portions for said rod, a plurality of elongated segmental friction elements disposed about said rod substantially in edge to edge relation, a clamping frame mounted in said housing and including a yoke portion substantially surrounding said friction elements and rod, and spring means effective between said clamp and friction elements to urge the latter inwardly in clamping relation with the rod.

3. In a friction box arranged to clampingly and slidingly engage a reciprocable rod, a housing having bearing portions for said rod, a clamping frame associated with said housing, a plurality of elongated segmental friction shoes arranged to surround said rod, said clamping frame including a pair of yoke members to surround said friction shoes, a saddle member in said frame, said saddle and yoke members including pressure applying portions adapted to engage said shoes, a spring overlying said saddle member and a lever on said frame arranged to engage said spring and thereby to force said friction shoes inwardly in clamping relation with said rod.

4. A friction box or the like for slidingly and clampingly engaging a reciprocable rod, including a housing having bore portions to receive said rod, a plurality of elongated segmental friction shoes uniformly disposed in surrounding relation with said rod, a clamping frame mounted in said housing, a saddle member within said frame, said clamping frame and saddle each including a plurality of pressure applying portions arranged to engage said shoes at a plurality of points, and resilient means for forcing said pressure applying portions against said shoes, whereby to clamp said housing to said rod while permitting relative longitudinal movement thereof.

5. In combination with a reciprocatory friction rod of a flat knitting machine, a friction box including quadrant sections for engaging said rod and pressure applying means effective upon said sections at a plurality of points along non-vertical lines about the circumference of said rod for causing said means to securely grip the latter and permit subsequent relative longitudinal sliding movement thereof.

6. In combination with a reciprocating rod, a motion transmitting device arranged to grip and release said rod and to permit relative sliding movement thereof, said device including quadrant friction shoe segments arranged substantially edge to edge about said rod, and four point pressure applying means for engaging said segments tangentially and pressing the same inwardly to uniformly grip the rod.

7. A frictional device for use with a reciprocating rod, including a housing having bearing portions for said rod, a plurality of quadrant friction elements disposed about said rod, a clamping frame mounted in said housing and including a yoke portion substantially surrounding said elements and said rod, and spring means effective between said clamp and elements to urge the latter inwardly in gripping relation with the rod.

8. In a friction box arranged to grippingly and slidingly engage a reciprocable rod, a housing having bearing portions for said rod, a clamping frame associated with said housing, a plurality of elongated segmental friction shoes arranged to surround said rod, said clamping frame including a yoke member to surround said friction shoes, a saddle member in said frame, said saddle and yoke member including V-block pressure applying portions adapted to tangentially engage said shoes, a spring overlying said saddle member and means on said frame to actuate said spring and thereby force said friction shoes inwardly in gripping relation with said rod.

9. A friction box or the like for slidingly and grippingly engaging a reciprocable rod, including a housing having bore portions to receive said rod, a plurality of elongated segmental friction shoes uniformly disposed in surrounding relation with said rod, a clamping frame mounted in said housing, a saddle member within said frame, said clamping frame and saddle each including a plurality of pressure applying portions arranged to engage said shoes at a plurality of uniformly spaced radially opposite points at an angle to each other in the case of adjacent shoes, and a spring for forcing said pressure applying portions against said shoes in gripping relation while permitting relative longitudinal movement thereof during the latter.

10. In combination with a reciprocatory friction rod of a flat knitting machine, a friction box and means for maintaining substantially uniform gripping and sliding coaction between said box and said rod, said means including quadrant sections for frictionally engaging said rod and pressure applying means effective upon said sections for exerting a grip on said rod while permitting relative longitudinal sliding movement thereof.

11. In combination with a reciprocating rod, a motion transmitting device and means for maintaining substantially uniform gripping and sliding coaction between said rod and device, said means including quadrant friction shoe segments arranged substantially edge to edge about said rod, and means for pressing said segments inwardly in gripping relation upon the rod, with lines of gripping pressure exerted inwardly at an angle to each other in the case of immediately adjacent sections.

12. A frictional device for use with a reciprocating rod, including a housing having bearing portions for said rod, a plurality of quadrant friction elements disposed about said rod at an angle of substantially ninety degrees one to another, a clamping frame surrounding said elements and said rod, and spring means effective between said clamp and elements to urge the latter inwardly in substantially uniform gripping and sliding coaction with said rod.

13. In a friction box arranged to grip and slidingly engage a reciprocable rod, a housing having bearing portions for said rod, a clamping frame associated with said housing, a plurality of friction shoes arranged to surround said rod, said clamping frame including a portion to surround said friction shoes, a saddle member in said frame, said saddle and clamping frame portion including V-block pressure applying parts adapted to tangentially engage said shoes, a spring on said frame and means to actuate said spring and thereby force said friction shoes inwardly in gripping relation with said rod.

14. A friction box or the like arranged for substantially uniform gripping and sliding coaction with a reciprocable rod, including an elongated housing having bearing portions at opposite ends to receive said rod, a plurality of pairs of friction shoes uniformly disposed in surrounding relation with said rod, intermediate said bearing portions, a clamping frame in said housing, a saddle member within said frame, said clamping frame and saddle each including a plurality of pressure applying portions arranged to engage said shoes at a plurality of uniformly spaced radially opposite points and a spring for forcing said pressure applying portions against said shoes thereby causing the latter to securely grip the rod and to permit relative longitudinal sliding movement of said rod during such gripping engagement.

15. In combination with a reciprocatory friction rod of a flat knitting machine, a friction box, and means for maintaining substantially uniform gripping and sliding engagement between said box and said rod, said means including a plurality of substantially similar friction elements disposed about said rod, and means for urging said friction elements radially inward from points disposed above, below and at the sides of said rod.

16. In combination with a reciprocatory friction rod of a knitting machine, a friction box arranged to clampingly and slidingly engage said rod, said friction box including a plurality of friction shoe segments arranged substantially edge to edge about said rod, and pressure applying means for individually pressing adjacent segments inwardly at an angle to each other to uniformly clamp the same about the rod.

17. In combination with a reciprocatory friction rod of a knitting machine, a friction box arranged to clampingly and slidingly engage said rod, said friction box including a plurality of friction shoe segments arranged substantially edge to edge about said rod, pressure applying means for individually pressing adjacent segments inwardly at an angle to each other to uniformly clamp the same about the rod, and means for preventing rotative movement of said friction shoe segments relative to said friction box.

MAX RICHTER.